US006672734B2

(12) United States Patent
Lammers

(10) Patent No.: US 6,672,734 B2
(45) Date of Patent: Jan. 6, 2004

(54) ILLUMINATION SYSTEM AND DISPLAY DEVICE

(75) Inventor: Liane Lammers, Best (NL)

(73) Assignee: Lumileds Lighting U.S., LLC, San Jose, CA (US)

( * ) Notice: Subject to any disclaimer, the term of this patent is extended or adjusted under 35 U.S.C. 154(b) by 0 days.

(21) Appl. No.: 10/144,828

(22) Filed: Oct. 25, 2001

(65) Prior Publication Data

US 2002/0135997 A1 Sep. 26, 2002

(30) Foreign Application Priority Data

Oct. 25, 2000 (EP) ............................................. 00203718

(51) Int. Cl.$^7$ ................................................. F21V 8/00
(52) U.S. Cl. ......................................... 362/31; 362/293
(58) Field of Search ........................... 362/31, 222, 223, 362/225, 293

(56) References Cited

U.S. PATENT DOCUMENTS

| | | | | |
|---|---|---|---|---|
| 5,079,675 A | * | 1/1992 | Nakayama et al. | 362/31 |
| 5,575,549 A | * | 11/1996 | Ishikawa et al. | 362/31 |
| 5,664,862 A | * | 9/1997 | Redmond et al. | 362/31 |
| 5,718,497 A | * | 2/1998 | Yokoyama et al. | 362/31 |

FOREIGN PATENT DOCUMENTS

| GB | 2647549 A | 6/2000 | ......... G02F/1/1335 |
|---|---|---|---|

OTHER PUBLICATIONS

Patent Abstracts of Japan, Suzuki Shingo, "Sheet–Like Lighting System," Publication No. 2000011723, Jan. 14, 2000, Application No. 10182076, Jun. 29, 1998.

* cited by examiner

Primary Examiner—Laura K. Tso
(74) Attorney, Agent, or Firm—Patent Law Group LLP

(57) ABSTRACT

A backlight system comprises a light-emitting panel (1) having a front wall (2) and, opposite thereto, a rear wall (3), and opposite first and second light-transmitting edge surfaces (4; 5) associated with a plurality of first and second light sources (6; 7). Light originating from the light sources (6; 7) is diffused in the panel (1). Parts of the surface areas (8; 9) of the rear wall (3) are provided with extraction means (18, 18', . . . ; 19, 19', . . . ) for extracting light from the panel (1). First extraction means (18, 18', . . . ) extract light from, preferably, the first light source (6), and vice versa In operation, said parts of the surface areas (8; 9) project light on a (LCD) display device panel (34) with an associated color filter (35). In the vicinity of the second edge area (5), the concentration of the first extraction means (18, 18', . . . ) is higher than that of the second extraction means (19, 19', . . . ), and vice versa. Preferably, the extraction means (18, 18', . . . , 19, 19', . . . ) are wedge-shaped, a side surface of the first extraction means (18, 18', . . . ) directed towards the second light source (7) extending parallel to the second edge surface (5), and vice versa. Preferably, the light sources (6; 7) comprise a plurality of blue, green, (amber) and red LEDs, each preferably having a luminous flux of at least 5 lumen.

17 Claims, 4 Drawing Sheets

ILLUMINATION SYSTEM AND DISPLAY DEVICE

BACKGROUND

1. Field of Invention

The invention relates to an illumination system for illuminating a display device, which illumination system is provided with a light-emitting panel comprising

- a front wall and, opposite thereto, a rear wall as well as a first and a second light-transmitting edge surface which are situated between the front wall and the rear wall,
- at least one first light source being associated with the first edge surface and at least one second light source being associated with the second edge surface, and
- in operation, light originating from the first light source being incident on the first light-transmitting edge surface, and light originating from the second light source being incident on the second light-transmitting edge surface, said light spreading in the light-emitting panel.

The invention also relates to a display device provided with said illumination system.

2. Description of Related Art

Such illumination systems are known per se and are also referred to as edge lighting systems. They are applied, inter alia, as backlighting of (image) display devices, for example for television receivers and monitors. Such illumination systems can particularly suitably be used as backlights for non-emissive displays, such as liquid crystal display devices, also referred to as LCD panels, which are employed in (portable) computers or (cordless) telephones.

Such display devices generally comprise a substrate provided with a regular pattern of picture elements (pixels), which are each controlled by at least one electrode. In order to form an image or a datagraphic display in a relevant area of a (display) screen of the (image) display device, the display device employs a control circuit. In a LCD device, the light originating from the backlight is modulated by means of a switch or a modulator, whereby various types of liquid crystal effects are employed. In addition, the display may be based on electrophoretic or electromechanical effects.

In the illumination systems mentioned in the opening paragraph, a tubular low-pressure mercury-vapor discharge lamp, for example one or more compact fluorescent lamps, is generally used as the light source, the light emitted, in operation, by the light source being coupled into the light-emitting panel which serves as an optical waveguide. This optical waveguide generally forms a comparatively thin, flat panel which is made of, for example, a synthetic resin or glass, with light being transported through the optical waveguide under the influence of (total) internal reflection.

Such an illumination system may also be provided with an alternative light source in the form of a plurality of opto-electronic elements, also referred to as electro-optic elements, such as electroluminescent elements, in particular light-emitting diodes (LEDs). These light sources are generally provided so as to be close to or abut against a light-transmitting edge surface of the light-emitting panel, so that, in operation, light originating from the light source is incident on the light-transmitting edge surface and spreads into the panel.

In U.S. Pat. No. 5,664,862, a description is given of an illumination system for illuminating a LCD panel. For the light source use is made of incandescent lamps. Other light sources, such as fluorescent lamps and light-emitting diodes are also mentioned. In operation, the light source couples light into the light-emitting panel via a first light-transmitting edge surface, said light-emitting panel also being referred to as light guide. The rear wall of the light-emitting panel is provided with coupling-out members, also referred to as facets. These facets are preferably shaped such that light entering the panel via the first light-transmitting edge surface is reflected, predominantly in the longitudinal direction of the panel, in the direction of the opposite second light-transmitting edge surface. The light reflected at this second light-transmitting edge surface strikes the facets, as a result of which the light is partly deflected so as to be coupled out of the light-emitting panel, and partly continues on its way through the light-emitting panel. The facets are provided in the rear wall in such a manner that a uniform light distribution on the LCD panel to be illuminated is obtained.

An illumination system of the above-mentioned type has the disadvantage that the light distribution in the light-emitting panel, particularly close to the light source, is insufficiently uniform. As a result, the display device is illuminated insufficiently uniformly.

SUMMARY

It is an object of the invention to completely or partly obviate said drawbacks. The invention more particularly aims at providing an illumination system of the type mentioned in the opening paragraph, wherein the uniformity of the light distribution of the illumination system, and hence the uniformity with which the display device is illuminated, is improved.

In accordance with the invention, this object is achieved in that,

- a first sub-surface of the front wall or of the rear wall of the light-emitting panel is provided with first coupling-out members for coupling light out of the panel, which light predominantly originates from the first light source, and
- in that a second sub-surface of the front wall or of the rear wall of the light-emitting panel is provided with second coupling-out members for coupling light out of the panel, which light predominantly originates from the second light source,
- the concentration of the first coupling-out members near the second edge surface being higher than the concentration of the second coupling-out members, and
- the concentration of the second coupling-out members near the first edge surface being higher than the concentration of the first coupling-out members.

By dividing the coupling-out members into first coupling-out members, which predominantly couple out light originating from the first light source, and second coupling-out members, which predominantly couple out light originating from the second light source, and by clustering these coupling-out members into, respectively, a first sub-surface and a second sub-surface, said sub-surfaces being positioned at some distance from the edge surface where the light of the relevant first or second light source is coupled into the light-emitting panel, it becomes possible to use a part of the light-emitting panel to mix light originating from the respective light sources before the light of these light sources contacts coupling-out members which couple light out of the light-emitting panel. By raising the concentration of the first coupling-out members close to the second edge surface, which first coupling-out members have a preference for coupling-out light originating (directly) from the first light source, it is achieved that light originating from the first light source first travels through the light-emitting panel for a while, as a result of which the risk of the light striking coupling-out members coupling out said light is comparatively small. In other words, if the concentration of the second coupling-out members near the first edge surface is chosen to be higher than the concentration of the first coupling-out members, a substantial part of the light originating (directly) from the first light source is coupled out of the light-emitting panel at locations which are situated at a comparatively large distance from the first edge surface. The same is true for light originating from the second light source. By raising the concentration of the second coupling-out members close to the first edge surface, which second coupling-out members have a preference for coupling out light originating (directly) from the second light source, it is achieved that light originating from the second light source first travels through the light-emitting panel for a while, as a result of which the risk of the light striking coupling-out members coupling out said light is comparatively small.

Using a part of the light-emitting panel to enhance the mixing of light has the additional advantage that a separate light-mixing chamber wherein light originating from the light source(s) is mixed before being coupled into the light-emitting panel is no longer necessary, which leads to a considerable saving in space in the illumination system. As a result of the measure in accordance with the invention, a part of the light-emitting panel is used, as it were, as a type of "internal" light-mixing chamber.

Mixing light in the light-emitting panel is very advantageous if the light source comprises a collection of light sources of different colors, for example blue, green, (amber) and red light sources, for example a collection of light-emitting diodes of different colors. Such a collection can be provided, in the form of an array, so as to lie against the light-transmitting edge surface of the light-emitting panel, and the colors, the wavelength and the mutual intensity of the various light sources of different colors can be selected to be such that, after sufficient mixing, white light of a certain (adjustable) color temperature is formed. Color effects occurring at the edges of the light-emitting panel and being visible in the display device as a result of insufficient mixing of light are undesirable.

By virtue of the measure in accordance with the invention, a kind of (optical) division is brought about between the coupling-out members which couple out light originating from the first light source, and the coupling-out members which couple out light originating from the second light source.

In general, in the illumination system in accordance with the invention, the respective sub-surfaces co-operate to uniformly illuminate the display device. The choice of the sub-surfaces and the distribution of the coupling-out members over said sub-surfaces is such that light which, in operation, is emitted by each of the sub-surfaces uniformly illuminates the display device.

By virtue of the measure in accordance with the invention, the uniformity of the distribution of the light emitted by the illumination system is improved. As a result, a more uniform illumination of the (image) display device is obtained.

In the known illumination system, the coupling-out members are formed such that light entering the panel via the light-transmitting edge surface and striking the coupling-out members is reflected substantially in the longitudinal direction of the panel, i.e. in the direction of the opposite edge surface. Light originating from the light-transmitting edge surface which, upon reflection from this opposite edge surface, strikes the coupling-out members can be subsequently coupled out of the panel in that the shape of the coupling-out members is different for this propagation direction. If light cannot be coupled out until after said reflection from the edge surface opposite the light-transmitting edge surface, then the efficiency of the light-emitting panel is adversely affected.

The shape of the coupling-out members influences the way in which light issues from the light-emitting panel. A favorable embodiment of the illumination system is characterized in accordance with the invention in that the first and second coupling-out members are wedge-shaped,
 a side face of the first coupling-out members facing the second light source extending at least substantially parallel to the second edge surface, and
 a side face of the second coupling-out members facing the first light source extending at least substantially parallel to the first edge surface.

As the side face of the first coupling-out members facing the second light source extends transversely to the (principal) direction in which the second light source emits light, light is not coupled out of the light-emitting panel when light emitted (directly) by the second light source strikes the first coupling-out members. As the side face of the second coupling-out members facing the first light source extends transversely to the (principal) direction in which the first light source emits light, light is not coupled out of the light-emitting panel when light emitted (directly) by the first light source strikes the second coupling-out members. Light reflected in this manner moves substantially parallel to the longitudinal direction of the panel. Light can only be coupled out of the light-emitting panel if it strikes a side face of a coupling-out member which does not extend transversely to the (principal) direction of propagation of the light. By reducing the possibility that light originating directly from one of the light sources proximate to the edge surface with which the relevant light source is associated is coupled out, the mixing of light proximate to the relevant light source is improved.

The shape of the sub-surfaces and their position relative to each other, in conjunction with the way in which the light coupling-out members are distributed over the sub-surfaces, influence the way in which light issues from the light-emitting panel.

A favorable embodiment of the illumination system is characterized in accordance with the invention in that each of the sub-surfaces comprises a single surface which covers approximately half the front wall or rear wall of the light-emitting panel,
 the coupling-out members being provided such that the degree to which light is coupled out by the sub-surfaces is at least substantially constant.

In this preferred embodiment of the illumination system, the first coupling-out members are mainly responsible for the illumination of one half of the display device, and the second coupling-out members are mainly responsible for the illumination of the other half of the display device. Preferably, the two sub-surfaces demonstrate some overlap in order to improve the uniformity of the illumination of the display device. The distribution of the coupling-out members over said sub-surfaces is so uniform that the light emitted by the sub-surfaces very uniformly illuminates the corresponding part of the display device. A uniformly illuminated display device is obtained by providing the sub-surfaces, preferably, on a part of the front wall or the rear wall which is situated at a (maximum) distance from the light-transmitting edge surface of the light source.

It is particularly favorable if the first sub-surface of the light-emitting panel illuminates predominantly one half of the display device, for example the lower half, while the second sub-surface of the light-emitting panel illuminates predominantly the other half of the display device, for example the upper half. This has the advantage that the illumination levels of the two halves of the display device may be different. This has the further advantage that the display screen of the display device is suitable for spatial sequential operation. In an alternative embodiment, a ridge is provided in one of the sub-surfaces or in both sub-surfaces, as a result of which mixing of light between the two halves of the display device is effectively precluded.

Apart from the above-described uniform distribution of the coupling-out members over the sub-surfaces, it may be advantageous, in accordance with alternative embodiments, to distribute the coupling-out members non-uniformly over the sub-surfaces. For this purpose, a suitable embodiment of the illumination system is characterized in that the sub-surfaces overlap each other partly.

Also a suitably chosen inhomogeneous distribution of the coupling-out members allows the light emitted by the various sub-surfaces to illuminate the display device very uniformly. For this purpose, a preferred, alternative embodiment of the illumination system in accordance with the invention is characterized in that the sub-surfaces extend over a substantial part of the front wall or the rear wall of the light-emitting panel, the coupling-out members being provided such that the amount of light coupled out changes as a function of the distance to the light-transmitting edge surface.

Preferably, the coupling-out members are provided throughout the front wall or rear wall of the light-emitting panel, the amount of light coupled out being comparatively small close to the light-transmitting edge surfaces and comparatively large close to the opposite edge surfaces.

In accordance with a particularly advantageous distribution, the coupling-out members are arranged such that the amount of light coupled out changes linearly as a function of the distance to the light-transmitting edge surface. In an alternative, favorable embodiment, the coupling-out members are arranged such that the coupling-out of light changes as the square of a sine or cosine.

The coupling-out members are preferably arranged on the rear wall of the light-emitting panel.

Preferably, the light source comprises at least a light-emitting diode (LED) having a luminous flux of at least 5 lm. LEDs having such a high output are also referred to as LED power packages. The use of these high-efficiency, high-output LEDs has the specific advantage that the number of LEDs necessary for a desired, comparatively high luminous output can be relatively small. This has a favorable effect on the compactness and the efficiency of the illumination system to be manufactured. Further advantages of the use of LEDs are a comparatively very long service life, comparatively low energy costs and comparatively low maintenance costs of an illumination system with LEDs.

The application of LEDs has the further advantage that dynamic illumination possibilities are obtained. For this purpose, an embodiment of the illumination system is characterized in that the light-emitting panel is provided with a sensor for measuring the optical properties of the light which, in operation, is emitted by the light source(s). If different types of LEDs are combined and/or LEDs of different colors are employed, colors can be suitably mixed, for example, to obtain white light of the desired color temperature. In addition, color changes can be obtained independent of the state of the display device. The sensor can be provided, for example, on an edge surface of the light-emitting panel.

In a further preferred embodiment, the illumination system comprises control electronics for changing the luminous flux of the light source. Suitable control electronics enables the desired illumination effects to be achieved and the uniformity of the coupled-out light to be improved. In addition, a suitable combination of LEDs enables white light to be obtained, a desired color temperature of which can be adjusted by means of control electronics.

In a preferred embodiment of the illumination system, the light source comprises at least two light-emitting diodes having different light emission wavelengths. Such diodes emit light in a predetermined wavelength range. The LEDs comprise, preferably, the well-known combinations of blue, green and red LEDs or combinations of red, green, blue and amber LEDs.

These and other aspects of the invention will be apparent from and elucidated with reference to the embodiment(s) described hereinafter.

DETAILED DESCRIPTION

Figure 1A:
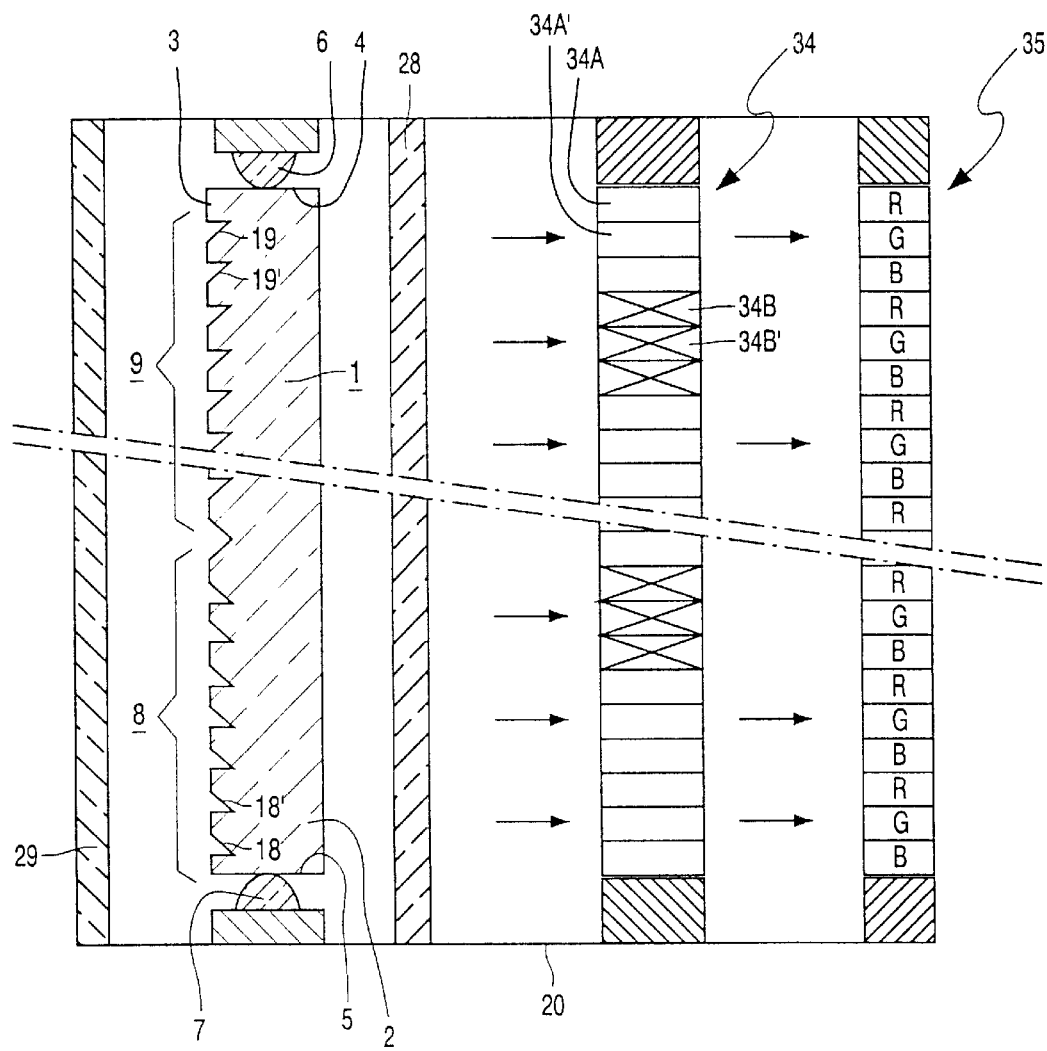
FIG. 1A is a cross-sectional view of a display device comprising an embodiment of the illumination system in accordance with the invention.

The Figures are purely diagrammatic and not drawn to scale. Particularly for clarity, some dimensions are exaggerated strongly. In the figures, like reference numerals refer to like parts whenever possible.

FIG. 1A is a cross-sectional view of an embodiment of an illumination system in accordance with the invention. The illumination system comprises a light-emitting panel 1 of a light-transmitting material. The panel 1 is made, for example, of a synthetic resin, acryl, polycarbonate, PMMA such as Perspex, or of glass. Under the influence of total internal reflection, light is transported, in operation, through the panel 1. The panel 1 comprises a front wall 2 and, opposite thereto, a rear wall 3. Between the front wall 2 and the rear wall 3 there are edge surfaces 4; 5, which are both light-transmitting. In the example shown in FIG. 1A, at least one light source 6 is associated with the edge surface referenced 4, and at least one light source 7 is associated with the edge surface referenced 5. In operation, light originating from the light source 6; 7 is incident on the light-transmitting edge surface 4; 5 and spreads in the panel 1.

In accordance with the invention, the front wall or the rear wall of the light-emitting panel comprises at least two types of coupling-out members which are suitably asymmetrically distributed over the front wall or the rear wall. In the example shown in FIG. 1A, a first sub-surface 8 of the rear wall 3 of the light-emitting panel 1 is provided with first coupling-out members 18, 18', . . . for coupling light out of the panel 1. The light coupled out by the first coupling-out members 18, 18', . . . predominantly originates from the first light source 6. FIG. 1A further shows a second sub-surface 9 of the rear wall 3 of the light-emitting panel 1 provided with second coupling-out members 19, 19', . . . for coupling light out of the panel 1. The light coupled out by the second coupling-out members 19, 19', . . . predominantly originates from the second light source 7. In FIG. 1A, sub-surfaces 8; 9 demonstrate a small overlap.

The coupling-out members 18, 18', . . . ; 19, 19', . . . comprise (patterns of) deformities, also referred to as facets, and, for example, screen printed dots, wedges and/or ridges. The coupling-out members are formed in the rear wall 3 of the light-emitting panel 1 by means of, for example, etching, scribing or sandblasting. In an alternative embodiment, the coupling-out members are provided in the front wall 2 of the light-emitting panel 1. In a further, alternative embodiment, the coupling-out members are embodied so as to be microstructures for coupling out light via diffraction. In general, the coupling-out members couple light out of the panel 1 by reflection, scattering, diffraction and/or refraction.

In the example shown in FIG. 1A, each of the sub-surfaces 8; 9 covers approximately half the rear wall 3 of the light-emitting panel 1, the coupling-out members 18, 18', . . . ; 19, 19', . . . being provided such that the amount of light coupled out by the sub-surfaces 8, 9 is at least substantially constant. In this embodiment, a kind of (optical) division between the coupling-out members coupling out light originating from the first light source and the coupling-out members coupling out light originating from the second light source is brought about. As a result, the light originating from one of the light sources 6; 7 travels a certain distance in the light-emitting panel 1 before light can be coupled out. If the light originating directly from the first light source 6 strikes the second coupling-out members 19, 19', . . . in the second sub-surface 9, the light is not coupled out. Only if the light originating from the first light source 6 strikes the first coupling-out members 18, 18', . . . in the first subsurface 8, the light can be coupled out of the light-emitting panel 1. An analogous situation occurs for light originating from the second light source. If the light originating directly from the second light source 7 strikes the second coupling-out members 18, 18', . . . in the first subsurface 8, then the light is not coupled out. Only if the light originating from the second light source 7 strikes the second coupling-out members 19, 19', . . . in the second sub-surface 9, the light can be coupled out of the light-emitting panel 1. Thus, the light originating from the respective light sources 6; 7 first travels a certain distance in approximately half the light-emitting panel 1 before light can be coupled out of the panel 1. These first parts of the light-emitting panel 1 are used to enhance mixing of the light originating from the light source 6; 7.

FIG. 1A also very diagrammatically shows an optional (polarizing) diffuser 28 and a reflective diffuser 29 which bring about further mixing of the light originating from the light-emitting panel 1 and provide the light with the desired polarization direction for the (LCD) (image) display device. Besides, in FIG. 1A reference numeral 34 refers to an LCD panel with a color filter 35, which are very diagrammatically shown. In FIG. 1A, LC elements 34A, 34A' are connected so as to transmit light. LC elements 34B, 34B' (indicated by means of a cross), however, do not transmit light (see the horizontal arrows in FIG. 1A). In this example, color filter 35 comprises three basic colors referenced R (red), G (green) and B (blue). The R, G, B filter elements in the color filter 35 correspond to the LC elements of the LCD panel 34.

The R, G, B filter elements only transmit light that corresponds to the color of the filter element.

The assembly of the light-emitting panel 1 and coupling-out members 18, 18', 19, 19', . . . , light source 6; 7, diffuser 28,; 29, LCD panel 34 and housing 20 forms a display device for displaying, for example, (video) images.

The light-emitting panel 1 is preferably provided with a sensor (not shown in FIG. 1A) for measuring the optical properties of the light which, in operation, is emitted by the light source 6; 7. This sensor is coupled to control electronics (not shown in FIG. 1A) for suitably adapting the luminous flux of the light source 6; 7. By means of said sensor and the control electronics, a feedback mechanism can be formed for influencing the quality and the quantity of the light coupled out of the panel 1.

Figure 1B:
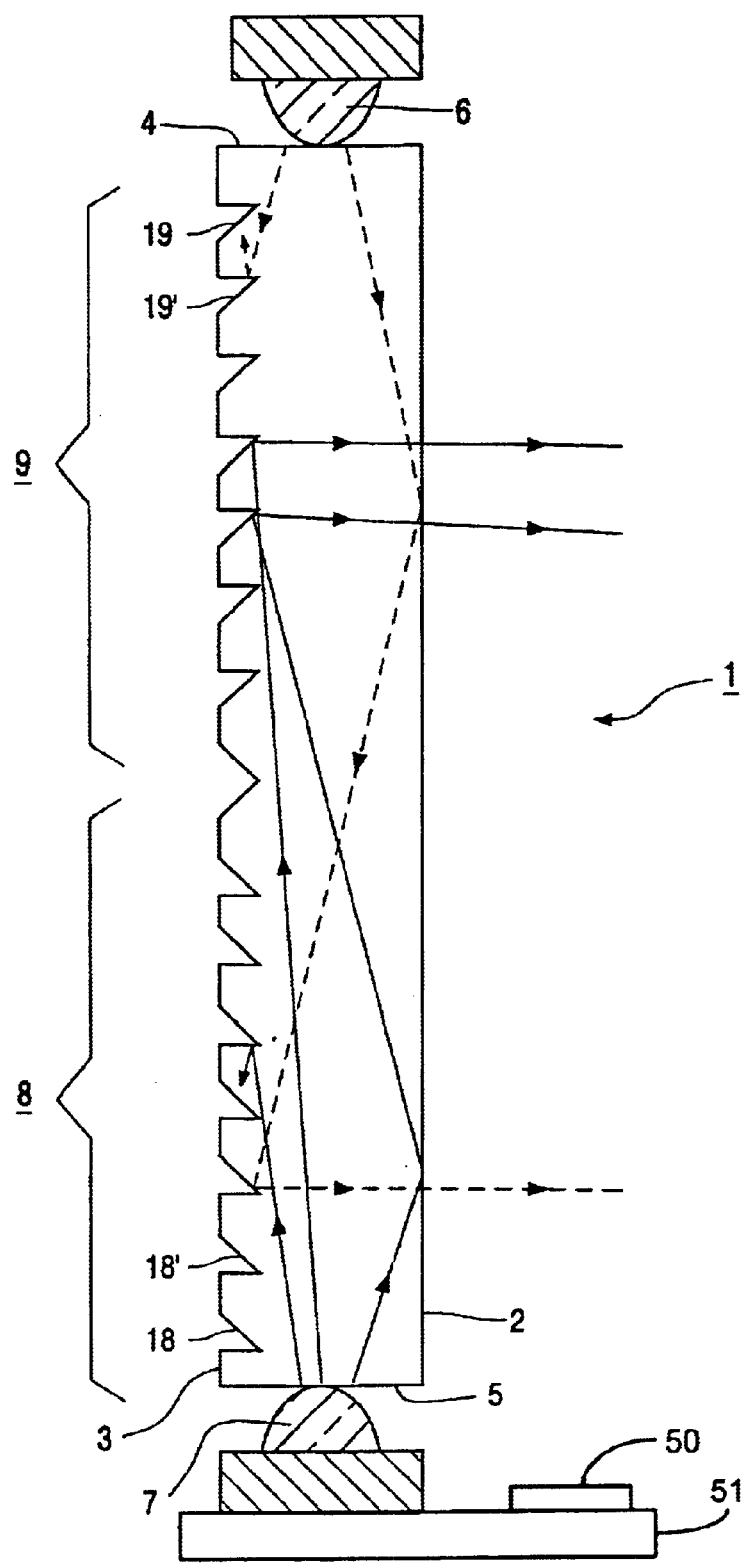
FIG. 1B shows a detail of the illumination system of FIG. 1A.

FIG. 1B diagrammatically shows, not to scale, a detail of the illumination system shown in FIG. 1A, i.e. the light-emitting panel provided with light sources 6; 7 and coupling-out members 18, 18', . . . ; 19, 19', . . . divided into respective sub-surfaces 8; 9. This Figure very diagrammatically shows a few light beams originating from the first light source 6 (interrupted lines) and from the second light source 7 (continuous lines), the direction of the light being indicated by means of arrows.

The coupling-out members 18, 18', . . . ; 19, 19', . . . provided in the rear wall 3 of the light-emitting panel 1 serve as secondary light sources. A specific optical system may be associated with these secondary light sources, which optical system is provided, for example, on the front wall 2 (not shown in FIGS. 1A and 1B). The optical system can be used, for example, to form a broad light beam.

In FIGS. 1A and 1B, the first and second coupling-out members 18, 18', . . . ; 19, 19', . . . are wedge-shaped, a side face of the first coupling-out members 18, 18', . . . facing the second light source 7 being at least substantially parallel to the second edge surface 5, and a side face of the second coupling-out members 19, 19', . . . , facing the first light source 6, being at least substantially parallel to the first edge surface 4. Said side faces of the coupling-out members 18, 18', . . . ; 19, 19', . . . thus extend substantially transversely to the rear wall 3. As a result of the provision of the coupling-out members 18, 18', . . . ; 19, 19', . . . , the angle between the rear wall 3 and the coupling-out members 18, 18', . . . ; 19, 19', . . . may deviate slightly from 90°. Such a deviation may favorably preclude that, upon reflection at said side face, the reflected light beam does not strike the adjacent coupling-out member.

In this example, the light source 6; 7 comprises a plurality of light-emitting diodes (LEDs), but it may alternatively be another light source, for example a discharge lamp or, in general, a plurality of opto-electronic elements, also referred to as electro-optic elements, such as electroluminescent elements. The source brightness of LEDs is many times higher than that of fluorescent tubes. In addition, in comparison with fluorescent tubes, LEDs enable light to be coupled into the light-emitting panel with a higher efficiency. The use of LEDs as the light source has the advantage that the LEDs may be in contact with panels made of a synthetic resin. LEDs hardly emit heat in the direction of the light-transmitting edge surface 4; 5 of the light-emitting panel 1, nor do they issue detrimental (UV) radiation. The use of LEDs has the additional advantage that means for coupling light originating from the LEDs into the panel can be dispensed with. The use of LEDs leads to a more compact illumination system.

Preferably, LEDs of three different colors are employed, i.e. blue, green and red LEDs. In an alternative embodiment, also amber LEDs are employed having a comparatively high light output. The LEDs used preferably each have a luminous flux of at least 5 lm. LEDs having such a high output are also referred to as LED power packages. Examples of power LEDs are "Barracuda"-type LEDs (Hewlett-Packard). The luminous flux per LED is 15 lm for red LEDs, 13 lm for green LEDs, 5 lm for blue LEDs and 20 lm for amber LEDs. In an alternative embodiment, "Prometheus"-type power LEDs (Hewlett-Packard) are employed having a luminous flux per LED of 35 lm for red LEDs, 20 lm for green LEDs, 8 lm for blue LEDs and 40 lm for amber LEDs.

Preferably, the LEDs are mounted on a (metal-core) printed circuit board 51. Control electronics 50, as described above, may also be mounted on circuit board 51. If power LEDs are provided on such a (metal-core) printed circuit board (PCB) by means of, for example, a heat-conducting adhesive, the heat generated by the LEDs can be readily dissipated by thermal conduction via the PCB. In another interesting embodiment of the illumination system, the (metal-core) printed circuit board is in contact with the housing of the display device via a suitable heat-conducting connection (for example a heat-conducting metal, such as aluminum). In general, in accordance with the measure of the invention, the concentration of the first coupling-out members near the second edge surface is higher than the concentration of the second coupling-out members, and the concentration of the second coupling-out members near the first edge surface is higher than the concentration of the first coupling-out members.

In an alternative embodiment of the illumination system in accordance with the invention, the sub-surfaces partly overlap each other. Preferably, the sub-surfaces extend over a substantial part of the front wall or rear wall of the light-emitting panel, the coupling-out members being provided such that the amount of light coupled out changes gradually as a function of the distance to the light-transmitting edge surface.

Figure 2A:
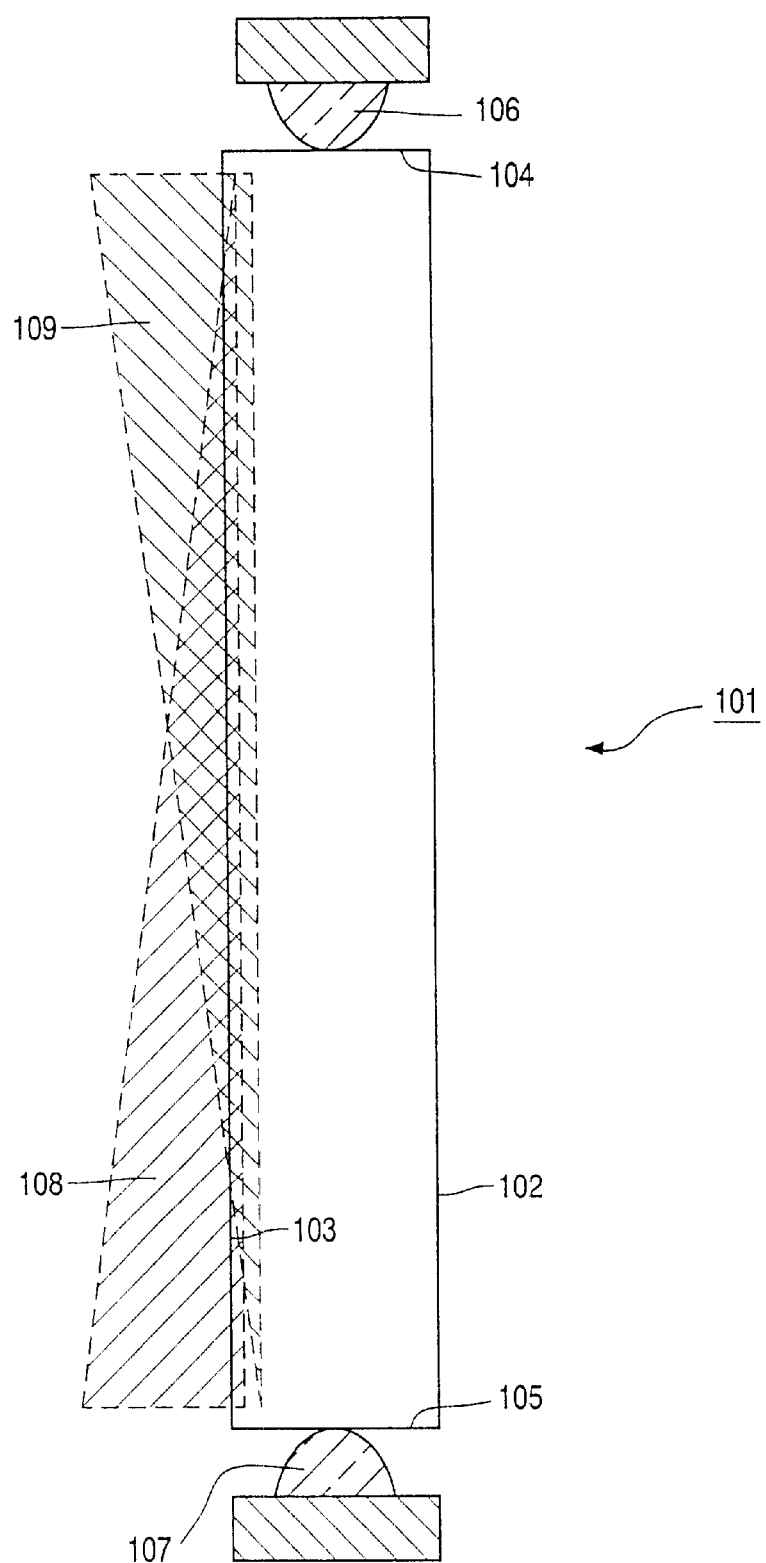
FIG. 2A is a cross-sectional view of a detail of an alternative embodiment of the illumination system in accordance with the invention.

FIG. 2A is a diagrammatic, cross-sectional view of a detail of an alternative embodiment of the illumination system in accordance with the invention. With respect to FIGS. 1A and 1B, corresponding parts in FIG. 2A are indicated by means of reference numerals that are 100 higher. The illumination system comprises a light-emitting panel 101 having a front wall 102 and a rear wall 103. The edge surfaces referenced 104; 105 are light-transmitting and associated with at least one light source 106; 107.

In the embodiment of the illumination system in accordance with the invention shown in FIG. 2A, the sub-surfaces 108; 109 comprise the entire rear wall 103 of the light-emitting panel 101. The sub-surfaces 108; 109 are depicted as triangles to indicate that the coupling-out members (not shown in FIG. 2A) are provided such that the amount of light coupled out changes linearly as a function of the distance to the light-transmitting edge surface 104, 105. In the vicinity of the first light source 106, the amount of light coupled out is small as a result of the first coupling-out members forming part of the sub-surface 108, and in the vicinity of the edge surface 105 opposite the light-transmitting edge surface 104, the amount of light coupled out is maximal as a result of the first coupling-out members forming part of the sub-surface 108. Correspondingly, in the vicinity of the second light source 107, the amount of light coupled out is small as a result of the second coupling-out members forming part of the sub-surface 109, and in the vicinity of the edge surface 104 opposite the light-transmitting edge surface 105, the amount of light coupled out is maximal as a result of the second coupling-out members forming part of the sub-surface 109. In this manner, a comparatively small amount of light originating directly from the first light source 106 is coupled out in the vicinity of the first light source 106 and, conversely, a comparatively small amount of light originating directly from the second light source 107 is coupled out in the vicinity of the second light source 107.

Figure 2B:
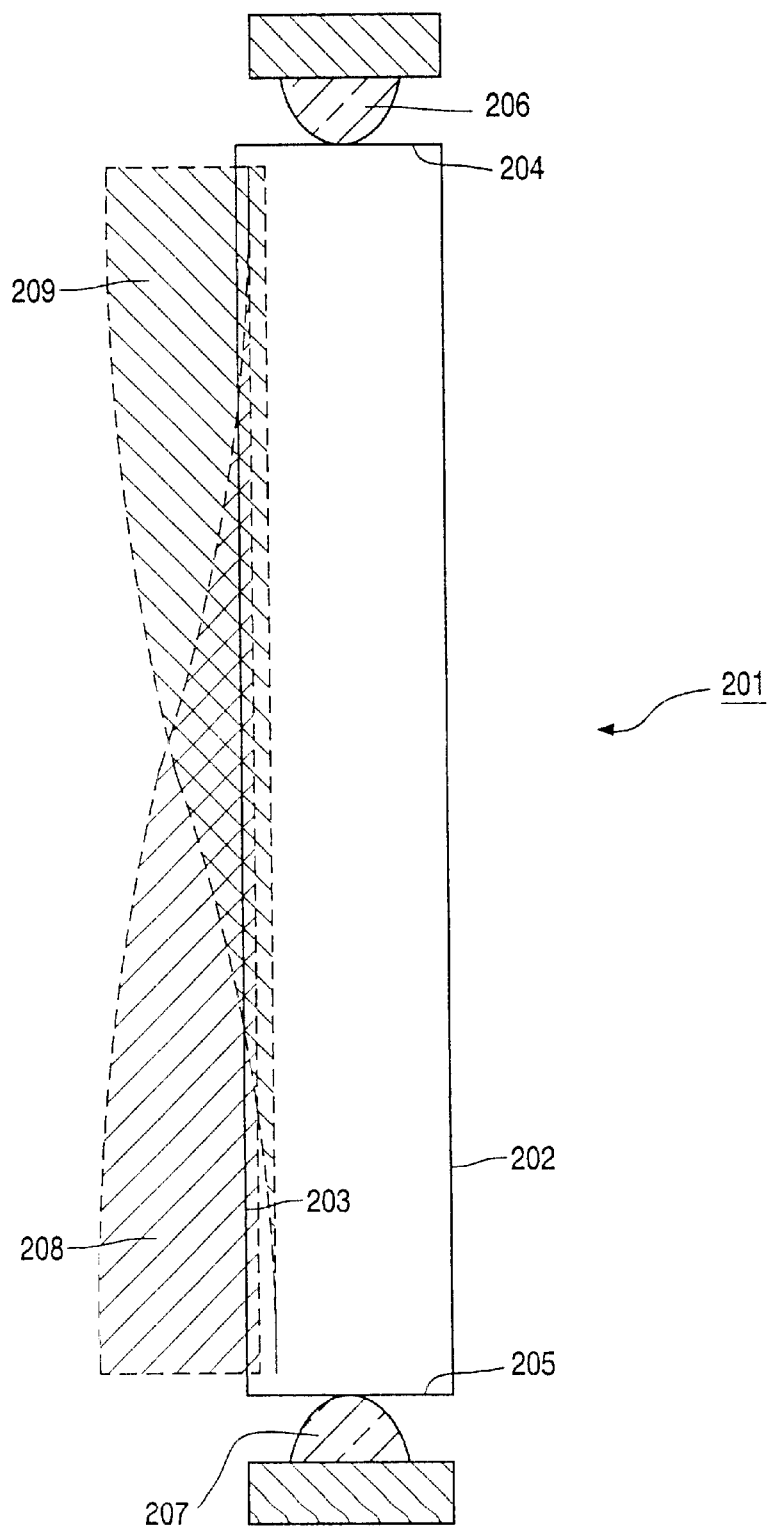
FIG. 2B is a cross-sectional view of a detail of a further, alternative embodiment of the illumination system in accordance with the invention.

FIG. 2B is a diagrammatic, cross-sectional view of a detail of an alternative embodiment of the illumination system in accordance with the invention. With respect to FIG. 2A, corresponding parts in FIG. 2B are indicated by means of reference numerals that are 100 higher. The illumination system comprises a light-emitting panel 201 having a front wall 202 and a rear wall 203. The edge surfaces referenced 204; 205 are light-transmitting and associated with at least one light source 206; 207.

In the embodiment of the illumination system in accordance with the invention shown in FIG. 2B, the sub-surfaces 208; 209 comprise the entire rear wall 203 of the light-emitting panel 201. The sub-surfaces 208; 209 are depicted as curved trihedrons to indicate that the coupling-out members (not shown in FIG. 2B) are provided such that the amount of light coupled out in the first sub-surface 208 changes in accordance with the square of a sine, while the amount of light coupled out in the second sub-surface 209 changes in accordance with the square of a cosine. Since the sum of the squares of the sine and the cosine is constant, a very uniform light distribution for the display device to be illuminated (not shown in FIG. 3B) is obtained by the illumination system. In a manner corresponding to that shown in FIG. 2A, the amount of light coupled out in the vicinity of the first light source 206 is small due to the first coupling-out members forming part of sub-surface 208, while in the vicinity of the edge surface 205 opposite the light-transmitting edge surface 204, the amount of light coupled out is maximal as a result of the first coupling-out member forming part of the sub-surface 208. Correspondingly, in the vicinity of the second light source 207, the amount of light coupled out is small as a result of the second coupling-out members forming part of the sub-surface 209, while in the vicinity of the edge surface 204 opposite the light-transmitting edge surface 205, the amount of light coupled out is maximal as a result of the second coupling-out members forming part of the sub-surface 209. In this manner, a comparatively small amount of light originating directly from the first light source 206 is coupled out in the vicinity of the first light source 206, and conversely, a comparatively small amount of light originating directly from the second light source 207 is coupled out in the vicinity of the second light source 207.

It will be clear that, within the scope of the invention, many variations are possible to those skilled in the art.

The scope of protection of the invention is not limited to the examples described hereinabove. The invention is embodied in each novel characteristic and each combination of characteristics. Reference numerals in the claims do not limit the scope of protection thereof. The verb "to comprise" and its conjugations does not exclude the presence of elements other than those mentioned in the claims. The use of the article "a" or "an" in front of an element does not exclude the presence of a plurality of such elements.

What is claimed is:

1. An illumination system for illuminating a display device, which illumination system is provided with a light-emitting panel comprising a front wall and, opposite thereto, a rear wall as well as first and second light-transmitting edge surfaces which are situated between the front wall and the rear wall, at least one first light source being associated with the first edge surface and at least one second light source being associated with the second edge surface, and in operation, light originating from the first light source being incident on the first light-transmitting edge surface, and light originating from the second light source being incident on the second light-transmitting edge surface, said light spreading in the light-emitting panel, wherein a first sub-surface of the front wall or of the rear wall of the light-emitting panel is provided with first coupling-out members for coupling light out of the panel, which light predominantly originates from the first light source, a second sub-surface of the front wall or of the rear wall of the light-emitting panel is provided with second coupling-out members for coupling light out of the panel, which light predominantly originates from the second light source, the concentration of the first coupling-out members near the second edge surface being higher than the concentration of the second coupling-out members, and the concentration of the second coupling-out members near the first edge surface being higher than the concentration of the first coupling-out members, and the first and second sub-surfaces overlap.

2. An illumination system as claimed in claim 1, wherein the first and second coupling-out members are wedge-shaped, a side face of the first coupling-out members facing the second light source extending at least substantially parallel to the second edge surface, and a side face of the second coupling-out members facing the first light source extending at least substantially parallel to the first edge surface.

3. An illumination system as claimed in claim 1, wherein each of the sub-surfaces comprises a single surface which covers at least half the front wall or rear wall of the light-emitting panel, the coupling-out members being provided such that the degree to which light is coupled out by the sub-surfaces is at least substantially constant.

4. An illumination system as claimed in claim 1,wherein the sub-surfaces extend over a substantial part of the front wall or the rear wall of the light-emitting panel, the coupling-out members being provided such that the amount of light coupled out changes as a function of the distance to the light-transmitting edge surface.

5. An illumination system as claimed in claim 1, wherein the first and the second light source comprise at least a light-emitting diode having a luminous flux of at least 5 lm.

6. An illumination system as claimed in claim 5, wherein the light-emitting diode is mounted on a printed circuit board.

7. An illumination system as claimed in claim 1, wherein the light source comprises at least two light-emitting diodes with different light emission wavelengths.

8. An illumination system as claimed in claim 1, wherein the illumination system comprises control electronics for changing the luminous flux of the light source.

9. A display device comprising:

a panel comprising a wall and first and second edges disposed at opposite ends of the wall, wherein the wall comprises a first sub-surface provided with first coupling out-members and a second sub-surface provided with second coupling-out members, and wherein the first and second sub-surfaces overlap;

a plurality of light emitting diodes, at least one light emitting diode being associated with each of the first edge and the second edge;

an array of liquid crystal elements; and a color filter;

wherein the array of liquid crystal elements is disposed between the color filter and the panel.

10. A display device as claimed in claim 9, further comprising a diffuser disposed between the array of liquid crystal elements and the panel.

11. A display device as claimed in claim 9, wherein:

the first coupling out-members comprise wedges having a side face substantially parallel to the second edge; and the second coupling-out members comprise wedges having a side face substantially parallel to the first edge.

12. A light emitting device comprising:

a panel comprising:

a surface;

a first edge and a second edge disposed at opposite ends of the surface;

a plurality of first coupling-out members formed on a first portion of the surface; and a plurality of second coupling-out members formed on a second portion of the surface;

wherein the first coupling-out members couple light from the first edge out of the panel;

the second coupling-out members couple light from the second edge out of the panel; and the first portion and second portion at least partially overlap;

a first light emitting diode positioned such that light emitted by the first light emitting diode is provided to the first edge; and a second light emitting diode positioned such that light emitted by the second light emitting diode is provided to the second edge.

13. The light emitting device of claim 12 wherein the first portion is adjacent to the second edge and the second portion is adjacent to the first edge.

14. The light emitting device of claim 12 wherein:

the first coupling-out members comprise wedges having a side face substantially parallel to the second edge; and the second coupling-out members comprise wedges having a side face substantially parallel to the first edge.

15. The light emitting device of claim 12 wherein a concentration of the first coupling-out members near the second edge is higher than a concentration of the second coupling-out members, and a concentration of the second coupling-out members near the first edge surface is higher than a concentration of the first coupling-out members.

16. The light emitting device of claim 12 wherein the first light emitting diode and the second light emitting diode each emit light having substantially the same color.

17. The light emitting device of claim 12 wherein the first light emitting diode and the second light emitting diode emit light having different colors.

* * * * *